United States Patent [19]
Liebert et al.

[11] 3,865,211
[45] Feb. 11, 1975

[54] STEERING SYSTEM WITH HYDRAULIC POWER ASSISTANCE

[75] Inventors: Karl-Heinz Liebert, Schwabisch Gmund; Werner Tischer, Unterbobingen, both of Germany

[73] Assignee: Zahnradfabrik Friedrichshafen AG, Friedrichshafen, Germany

[22] Filed: Mar. 30, 1973

[21] Appl. No.: 346,456

[30] Foreign Application Priority Data
Mar. 25, 1972 Germany.............................. 2214796

[52] U.S. Cl................. 180/79.2 R, 60/386, 60/403
[51] Int. Cl............................................... B62d 5/08
[58] Field of Search ................. 180/79.2 R, 79.2 B; 60/403, 386

[56] References Cited
UNITED STATES PATENTS
3,249,173  5/1966  Gordon .......................... 180/79.2 R
3,407,894  10/1968  Thompson et al. ............. 180/79.2 R
3,765,181  10/1973  Lang et al. ............................ 60/386

*Primary Examiner*—David Schonberg
*Assistant Examiner*—John A. Pekar

[57] ABSTRACT

Power operated steering system for vehicle wheels including two fluid circuits for each hydrostatic motor one of which is normally operative when its lines are pressurized. An indicator alerts the driver in response to loss of pressure in either fluid circuit because of hose line rupture or pump malfunction. The fluid circuit in which a break occurs, is automatically isolated from the system to prevent any loss of fluid from the system.

10 Claims, 2 Drawing Figures

STEERING SYSTEM WITH HYDRAULIC POWER ASSISTANCE

This invention relates to steering systems for vehicles having hydraulic power operating means.

Steering systems with hydraulic power assistance and hydrostatic transmission of the steering force to the wheels of the vehicle are well known. Such a system is particularly applicable to a motor vehicle having a servo pump, and includes a control pump acting as a metering control and a control valve, both of which are operable by way of a hand steering wheel, with at least two servo motors causing the steering deflection of the wheels of the vehicle which are to be steered. A reservoir fluid container and appropriate fluid lines are also provided whereby the pressure chambers of the servo motors are connected to two hydraulic circuits independent of one another. Such steering systems are arranged to maintain safe and reliable control of the vehicle by switching in the second hydraulic circuit.

In one well known type of hydrostatic 2-circuit steering system having a double flow control pump, rupture of a fluid connection results in escape of oil from the steering system and a reduction of the oil level in the reservoir tank. Since the reservoir tanks of hydrostatic steering systems are very small, any lowering of the oil level reflects a relatively large loss of oil so that continued steering of the vehicle for an extended period of time following a warning indication, is not assured.

In another known type of hydrostatic 2-circuit steering system, the affected section of the line is adapted to be isolated in the case of a break, so that no large quantity of oil can escape. However, the driver is not notified of the damage to the line, so that it often leads to an additional break in the hose and a breakdown in the entire steering system. Where the pressure in the steering system, under normal travel on the highway, is low, only a small reduction in pressure occurs in the case of a break of a line, which will make shifting of a control element for isolation of the defective line unreliable.

Therefore, it is an object of the invention to provide a steering system through which dirigibility of the vehicle remains assured after the break of a hose connection to which the driver is alerted by suitable means.

To achieve this objective, the invention provides pressure lines leading to the pressure chambers of the servo motors and pilot valves, and pressure switches operable by the pressure in the pressure lines of the hydraulic circuits against the bias return springs, with an indicator device for signalling any drop in pressure occuring in the pressure lines of both hydraulic circuits. At the same time that a break occurs in one circuit, the pressure lines in the other circuit to the pressure chambers of the control motors remain connected with the control valves for each of the positions of the pilot valves.

Figure 1:
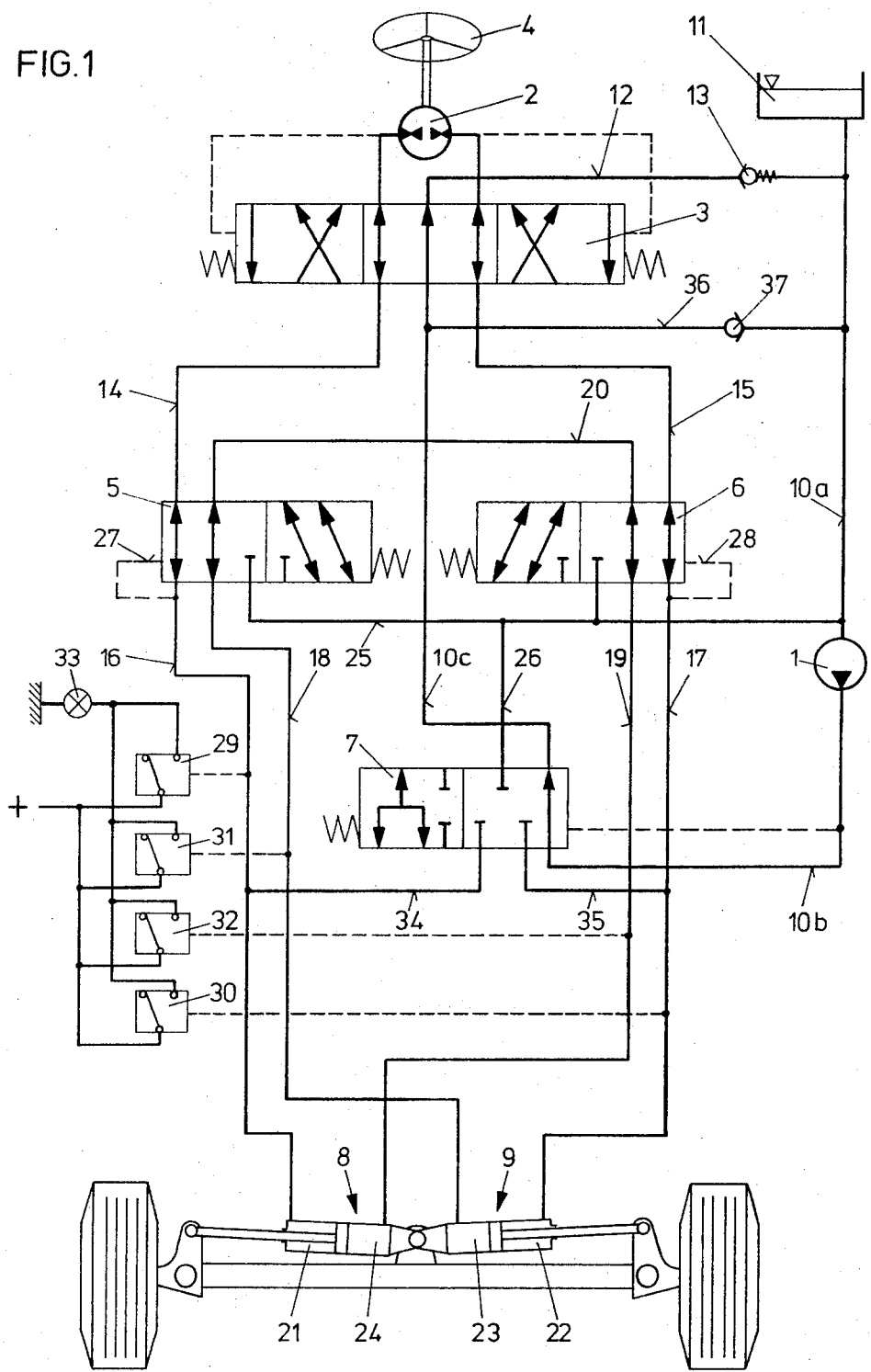
FIG. 1 shows a steering system in a neutral position of its control valve.

Referring now to the drawings in detail, the steering system shown in FIG. 1 includes pump 1, a control pump 2 and a control valve 3. The control pump 2 and valves are operated by a steering wheel 4 in a manner well known in the art. The steering system also includes two pilot valves 5 and 6 having two control positions, an auxiliary valve 7 and at least two servo motors 8 and 9 causing the deflection of the wheels of the vehicle that are to be controlled.

The suction side of the servo pump 1 is connected to a reservoir tank 11, by way of a line 10a, while the pressure side is connected to control valve 3 through line 10b, the auxiliary valve 7 which is operable by the feed pressure of the servo pump 1 against the bias of a return spring, and line 10c. A return line 12 having a pressure control valve 13 for pressurizing the steering system, connects the control valve 3 to the tank 11.

The pressure, determined by the pressure control valve 13 in the embodiment illustrated in FIG. 1, is applied through passages within the control valve 3 to two lines 14 and 15 leading from said control valve 3 to pilot valves 5 and 6, and through passages in the pilot valves 5 and 6 to the lines 16 and 17 of a first hydraulic circuit. The lines 18, 19 and 20 form a second hydraulic circuit. The lines 16 and 17 interconnect the pressure chamber 21 of the servo motor 8 and the pressure chamber 22 of the servo motor 9 with the pilot valves while the lines 18 and 19 interconnect the pressure chamber 23 of the adjusting motor 9 and the pressure chamber 24 of the servo motor 8 with the pilot valves 5 and 6. A connecting line 25 leads from the pilot valves 5 and 6 to the pump intake line 10a and through a branch line 26 to the auxiliary valve 7.

After build up of initial pressure in lines 16 and 17 applied through lines 27 and 28 the pilot valves 5 and 6 are shifted against the bias of their return springs. The pilot valves then assume the positions shown in FIG. 1 to which the pressure chambers 21 and 22 of the servo motors 8 and 9 are connected by way of the lines 16 and 14, or 17 and 15, with the control valve 3. The pressure chambers 23 and 24 of the servo motors 8 and 9 are at the same time short circuited via the lines 18, 20 and 19.

Since the lines 16, 17, 18 and 19 leading from the control valves 5 and 6 to the servo motors 8 and 9 are external hose that are displaceable because of the movements imparted to the servo motors 8 and 9, they are susceptable to rupture and a break of the line. Therefore, pressure switches 29, 30, 31 and 32 are mounted on the lines 16, 17, 18 and 19 and are connected electrically in parallel to energize a control lamp 33 visible from the driver's seat of the vehicle in response to a loss of pressure. The pressure switches 29, 30, 31 and 32 are actuated by a pressure determined by the pressure valve 13, so that illumination of the control lamp 33 indicates that a break in the line has occurred either in one of the hydraulic circuits or else that the servo pump 1 is not supplying fluid to the system.

In order to avoid the expense of safeguarding the lines 14, 15 and 20 between the control valve 3 and pilot valves 5 and 6, provision has been made for mounting the pilot valves 5 and 6 in the same housing enclosing the control pump 2 and the control valve 3. As a result, all required connections of lines between the control pump 2, the control valve 3 and the pilot valves 5 and 6 are established by channels formed inside of the housing or in a common valve body.

In the following explanation, a break in line 16 will be described by way of example. After the break in line 16, the pressure in said line and in the control line 27 collapses. Thus, the pilot valve 5 is shifted back into its starting position by the bias of its return spring to establish a connection between the control valve 3 and the pressure chamber 23 of the servo motor 9 via the lines 14 and 18. At the same time, the pressure switch 29 is closed to illuminate control lamp 33 and report the damage. The line 16 of the first hydraulic circuit and the pressure chamber 21 of the servo motor 8 are isolated from the steering system in this position of the pilot valve 5, so that operation of the steering system is controlled by only portions of the first and second hydraulic circuits. The portion of the second hydraulic circuit not utilized for the steering operation in this situation, is connected via the pilot valve 5 and the lines 25 and 10a to the tank 11.

If an additional break occurs in line 17, the pilot valve 6 is also shifted back to its starting position and operation of the steering system is now controlled entirely by the second hydraulic circuit. The lines 16 and 17 and the pressure chambers 21 and 22 of the first hydraulic circuit are isolated from the steering system, so that only the pressure medium located in these isolated parts can escape without any further loss of pressure medium from the rest of the system.

In case of a breakdown of servo pump 1, the liquid pressure required for a control of the auxiliary valve 7, collapses. The auxiliary valve 7 is shifted back by the bias of its return spring into its starting position and in this position it connects the lines 16 and 17 via two lines 34 and 35 and the lines 26, 25 and 10a with the tank 11. As a result, the liquid pressure required for control of the pilot valves 5 and 6 also collapses in the lines 16 and 17 and the pilot valves 5 and 6 are shifted back to their starting position by the bias of their return springs. A drop in pressure in both hydraulic circuits occurs and all pressure switches 29, 30, 31 and 32 are closed to report the breakdown by illumination of the control lamp 33. The differential pressure produced by the control pump 2 as a result of turning of the steering wheel 4 is transmitted via the lines 14 and 18 to the pressure chamber 23 of the servo motor 9 and by way of the lines 15 and 19 to the pressure chamber 24 of the servo motor 8. Thus, operation of the steering system by manual force is possible. Since lines 16 and 17 are then connected with the tank 11, no pressure can build up therein so that no shifting of the pilot valves 5 and 6 is possible. When a reduction in flow current from servo pump 1 occurs, the control pump sucks-in pressure medium by way of a line 36 through a suction check valve 37.

Even if the second hydraulic circuit is not in use during operation of the servo motors 8 and 9 under the pressure determined by the pressure regulating valve 13, a break in the line of the second hydraulic circuit is nevertheless reported by way of the pressure switch 31 or 32 through the control lamp 33. The attention of the driver is thereby attracted in advance of any damage in the steering system, even though the first hydraulic circuit is functioning.

Figure 2:
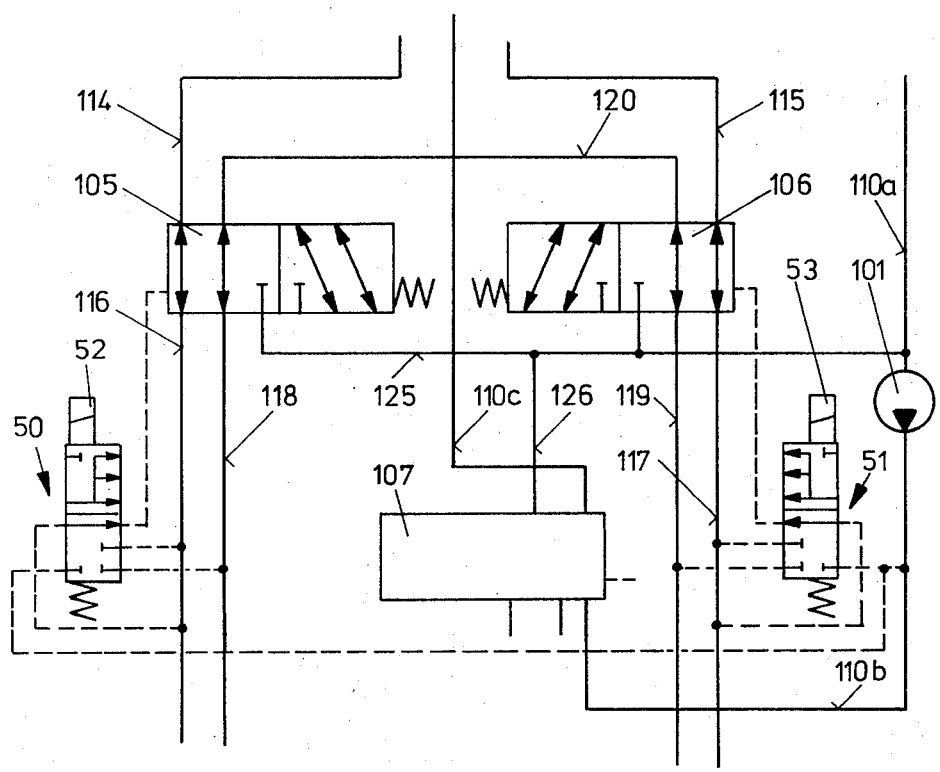
FIG. 2 shows a section of a steering system such as shown in FIG. 1 with a different embodiment of the primary control of the pilot valves.

In another embodiment shown by way of example, in FIG. 2 one precontrol valve 50 or 51 is provided for the primary control of each of the pilot valves 105 and 106 corresponding to valves 5 and 6 of FIG. 1. The valve actuating magnets 52 and 53 for the valves 50 and 51 are energized by starting current during starting of the engine of the vehicle. In the first control position of the precontrol valves 50 and 51, the pressure produced by the servo pump 101, corresponding to pump 1 in FIG. 1, is transmitted directly to the control side of the control valves 105 and 106, and to the lines 116 and 117 of the first hydraulic circuit, and to the lines 118 and 119 of the second hydraulic circuit. The two control magnets 52 and 53 are maintained energized to hold the valves 50 and 51 in the first control position by means of a delaying relay until build-up to a predetermined pressure. After that, the precontrol valves 50,51 are shifted under the bias of their return springs into their starting position, as shown in FIG. 2 in which the pressure in the lines 116 and 117 of the first hydraulic circuit is used for the control of the control valves 105 and 106.

The auxiliary valve 107 and the lines 110, 114, 115, 120, 125 and 126 of the second embodiment in FIG. 2 correspond to the auxiliary valve 7 and the lines 10, 14, 15, 20, 25 and 26 of the first embodiment of FIG. 1.

The advantage achieved by the present invention resides in the fact that the driver being immediately alerted of a break in the first hydraulic circuit or failure of the servo pump, can continue to use the steering system in a fast moving vehicle because the first hydraulic circuit is isolated from the steering system, and the second hydraulic circuit is switched in. Continued functioning of the system is thereby guaranteed. Thus the driver of the vehicle, in case of fast travel on the highway, can safely reduce the speed of travel when alerted and can steer the vehicle off the highway in order to find a suitable parking place or a garage to repair the steering system.

We claim:

1. In a hydrostatic power assist steering system for an engine driven vehicle having dirigible wheels, a source of fluid under pressure 1 and 11, fluid motor means 8 and 9 connected to said wheels for applying steering force thereto, at least two fluid circuits 16–17 and 18–19 connected to said fluid motor means independently of each other, a control valve 3 connected to said source of fluid under pressure, manually operable steering control means 2 and 4 connected to the control valve for selectively supplying pressurized fluid from the source to the fluid motor means through one of the fluid circuits 16–17, pressure operated valves means 5 and 6 connected between said control valve and the circuits for normally conducting the pressurized fluid through said one of the fluid circuits, and valve actuating means 27 and 28 connected to the pressure operated valve means for connecting the control valve to the other of the fluid circuits 18–19 in response to depressurization of said one of the fluid circuits.

2. The combination of claim 1 including pressure sensing means 29–33 connected to said fluid circuits for indicating said depressurization of said one of the fluid circuits.

3. The combination of claim 2 wherein said source of fluid under pressure comprises a reservoir 11 containing a body of said fluid and a servo pump 1 interconnected between the reservoir and the control valve.

4. The combination of claim 3 wherein said manually operable steering control means comprises a control pump 2 connected to the control valve and a steering wheel 4 drivingly connected to the control pump.

5. The combination of claim 4 wherein said fluid motor means comprises a pair of servo motors 8 and 9 having opposed pressure chambers 21, 22, 23, 24 to which the fluid circuits are connected.

6. The combination of claim 5 wherein each of said fluid circuits includes a pair of pressure lines 16 and 17 or 18 and 19 respectively connected to said servo motors.

7. The combination of claim 6 wherein said pressure operated valve means comprises a pair of pilot valves displaceable between operative positions alternately connecting the control valve to the two fluid circuits.

8. The combination of claim 7, including precontrol means 50 and 51 connecting the pilot valves and the fluid circuits to the servo pump for pressurizing both of the fluid circuits during starting operation of the vehicle engine.

9. The combination of claim 3 including auxiliary valve means 7 connected between the servo pump and the reservoir for alternately conducting pressurized fluid to the control valve of connecting said one of the fluid circuits to the reservoir.

10. The combination of claim 1 wherein said pressure operated valve means comprises a pair of pilot valves displaceable between operative positions alternately connecting the control valve to the two fluid circuits.

* * * * *